United States Patent [19]

Capps

[11] Patent Number: 4,561,818

[45] Date of Patent: Dec. 31, 1985

[54] APPARATUS FOR HANDLING BLENDED DRY PARTICULATE MATERIALS

[75] Inventor: Ernest R. Capps, Charlotte, N.C.

[73] Assignee: The Royster Company, Norfolk, Va.

[21] Appl. No.: 529,041

[22] Filed: Sep. 2, 1983

[51] Int. Cl.[4] .............................................. B65G 65/32
[52] U.S. Cl. .................................... 414/301; 198/642; 239/687
[58] Field of Search ............... 414/160, 205, 206, 293, 414/299, 300, 301; 239/681, 687; 198/642

[56] References Cited

U.S. PATENT DOCUMENTS

| | | | |
|---|---|---|---|
| 1,798,715 | 3/1931 | Aldrich et al. | |
| 1,960,797 | 5/1934 | Sackett | |
| 2,655,273 | 10/1953 | Snow | |
| 3,064,833 | 11/1962 | Von Ruden | 414/301 |
| 3,576,262 | 4/1971 | Konchesky | |
| 3,880,300 | 4/1975 | Uhl | |
| 4,272,028 | 6/1981 | Cobb | |

Primary Examiner—Robert G. Sheridan
Attorney, Agent, or Firm—Bell, Seltzer, Park & Gibson

[57] ABSTRACT

An apparatus for handling a mixture of dry particulate materials, such as a fertilizer, is disclosed, which is able to substantially alleviate the problem of particle segregation which normally results from the handling of such mixtures. The apparatus comprises a circular grate which is composed of a plurality of concentric annular rings defining annular openings therebetween. The grate is mounted for rotation about a vertical axis, and in use, the fertilizer is delivered onto the upper surface of the grate while the grate is rotated. The fertilizer falls through the openings without substantial segregation, to form a large circular discharge pattern which in turn forms a non-segregated relatively flat pile in an underlying truckbed or the like.

9 Claims, 5 Drawing Figures

APPARATUS FOR HANDLING BLENDED DRY PARTICULATE MATERIALS

The present invention relates to an apparatus for handling a mixture of dry particulate materials of differing physical properties, and which is adapted to permit a pile of the mixture to be formed in a bin, truckbed, or the like without substantial segregation of the particles.

It has long been recognized that the transport or handling of a mixture of dry particulate materials of differing physical properties will result in the segregation of unlike particles. More particularly, segregation occurs when individual particles in a mixture differ in physical properties to such an extent that they respond differently to the mechanical disturbances caused by the handling process. During these disturbances, particles of similar physical properties tend to congregate, thereby destroying the desired homogeneity of the mixture.

The problem of segregation is particularly evident in the handling of bulk blended fertilizers, which comprise particles of differing size and chemical composition. Segregation of such fertilizers is a serious problem, because the resultant nonuniformity and chemical variation in the blend can affect agronomic response, such as when the fertilizer is distributed from a truckbed onto a field.

One type of segregation which is often encountered in handling fertilizers is segregation which occurs when the fertilizer is dropped into a bin, truckbed or the like, and so that the material flows over itself to form a "cone". More particularly, the material dropped into the bin or truckbed forms a cone, with the material at the apex of the cone flowing downwardly over the pile surface. The smaller particles in the fertilizer are retarded to a greater extent by the frictional resistance of the pile surface, and thus they tend to come to rest quicker than the larger particles. As a result, the pile becomes segregated, with the smaller particles at the center of the pile and the larger particles at the perimeter.

It is accordingly an object of the present invention to provide an apparatus for handling a mixture of dry particulate materials of differing physical properties, and which effectively alleviates the problem of particle segregation.

It is a further object of the present invention to provide an apparatus which is adapted to reduce segregation in dry bulk blended fertilizers, and which is of relatively simple and inexpensive construction.

It is a more specific object of the present invention to provide an apparatus of the described type which is adapted to distribute bulk blended fertilizer as it is dropped into a bin or truckbed, and which effectively avoids "coning" and segregation by particle size in the resultant pile.

These and other objects and advantages of the present invention are achieved in the embodiment illustrated and described herein, by the provision of an apparatus which comprises a grate having a plurality of openings therethrough, with the openings collectively comprising a substantial portion of the area of the grate. The grate preferably has a generally planar upper surface and a circular peripheral outline, and includes a plurality of concentric annular rings, with the rings being radially spaced apart to define the openings therebetween.

The grate is mounted in a generally horizontal orientation just below the discharge end of a delivery conveyor belt or the like, and the grate is preferably mounted for rotation about a vertical axis. Thus in operation, the mixture is delivered onto the upper surface of the grate by the conveyor belt while the grate is rotating, and at least a substantial portion of the particulate materials passes downwardly through the openings of the grate and the remaining portion passes over the periphery of the grate in such a manner that the material is distributed over the area of the grate and into the underlying bin or truckbed without substantial segregation.

Some of the objects and advantages of the invention having been stated, others will appear as the description proceeds, when taken in connection with the accompanying drawings, in which FIG. 1 is a partly schematic side elevation view of an apparatus embodying the features of the present invention and configured for delivering a blended particulate material into a truckbed;

Figure 1:
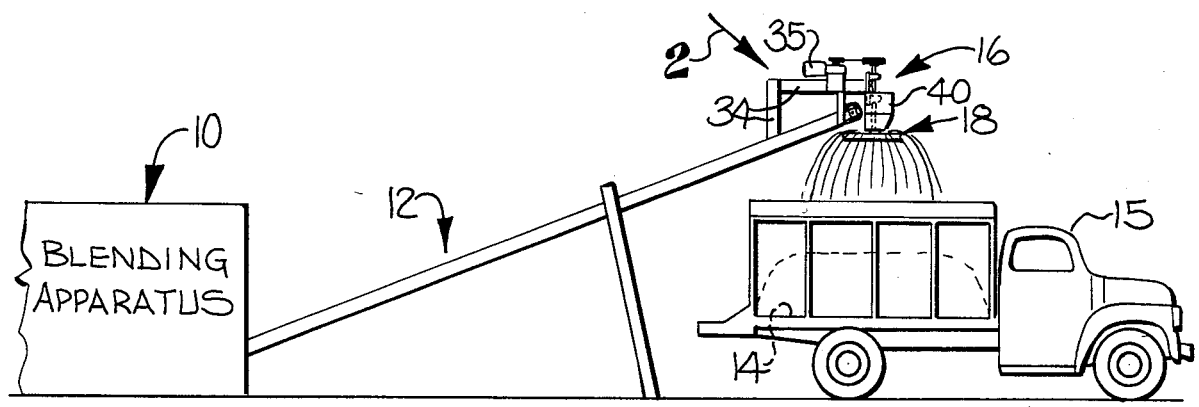
Figure 2:
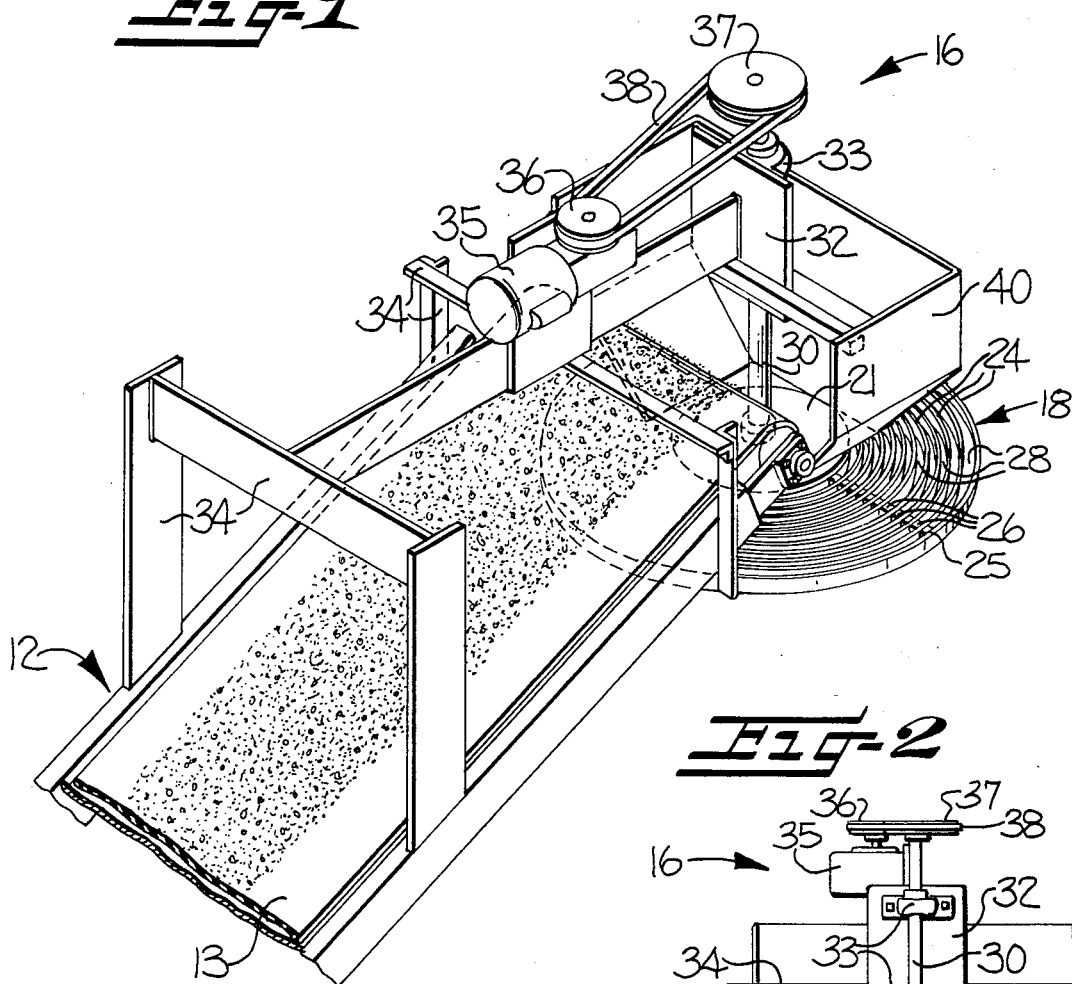
FIG. 2 is a fragmentary perspective view of the apparatus taken in the direction of the arrow 2 in FIG. 1.

Referring more particularly to the drawings, FIG. 1 schematically illustrates a conventional blending apparatus 10 of the type commonly used to blend weighed quantities of the various particulate ingredients of a commercial fertilizer or the like. An upwardly inclined conveyor 12 is associated with the apparatus 10, and includes an endless belt 13 for transporting the blended fertilizer to an elevated position above the bed 14 of a delivery truck 15.

The apparatus of the present invention is indicated generally at 16, and is mounted adjacent the discharge end of the conveyor belt 13 so that the discharged fertilizer falls onto the upper surface of the apparatus prior to being dropped into the truckbed 14. More particularly, the apparatus 16 comprises a grate 18 having a generally planar upper surface and a circular peripheral outline. The center portion 20 of the grate 18 comprises a circular non-perforated plate 21, with the outer peripheral portion 22 being composed of a plurality of concentric annular rings 24. Each of the rings 24 is composed of a segment of a hollow cylinder, and the rings are joined to each other by the radial spokes 25. Further, the rings are held in radially spaced apart relation by spacers 26, so as to define a plurality of concentric annular openings 28 between adjacent rings.

In the illustrated preferred embodiment, the rings 24 are radially spaced apart a distance not more than about twice the radial thickness of the rings, and the outer peripheral portion 22 comprises substantially more than one-half the total area of the grate in plan view. To more particularly describe the structure and dimensions of an actual specific example of the apparatus, the grate 18 had a diameter of about three feet, and the diameter of the plate 21 was less than about one and one-half feet, and specifically sixteen inches. Each of the rings 24 had a radial thickness of about one-fourth inch, and a height of one and one half inches, and the rings were radially spaced about one-half inch. Thus the openings 28 will be seen to collectively comprise more than half the area of the outer peripheral portion 22 in plan view, and a substantial portion of the entire area of the grate.

Figure 3:
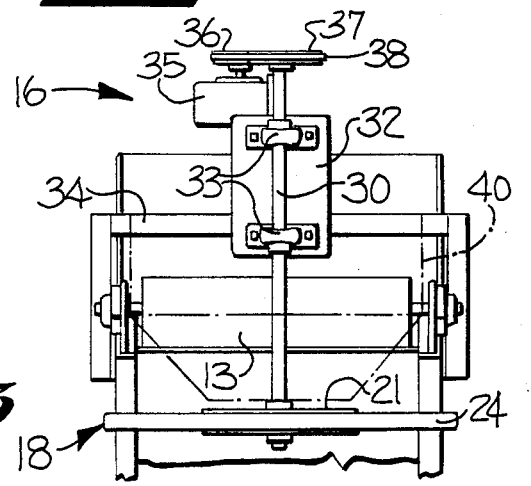
FIG. 3 is a front elevation view of the apparatus.

The grate 18 is supported by a vertically disposed mounting shaft 30, which is fixed to the plate 21 at the center of the circle defined by the grate and so that the grate is horizontally disposed. The shaft 30 is rotatably mounted to a support 32 by means of the bearings 33 (FIG. 3), and the support 32 is in turn mounted to a frame 34 mounted to the discharge end of the conveyor 12. A drive motor 35 is also mounted on the frame 34, which acts through the pulleys 36, 37 and belt 38 to rotate the shaft 30, and thus the grate 18, about the vertical axis of the shaft. A three-sided shroud 40 is also fixed to the frame 34 adjacent the discharge end of the conveyor and immediately above the grate, so as to funnel the material discharged by the conveyor onto the central portion of the horizontal upper surface of the grate.

Figure 4:
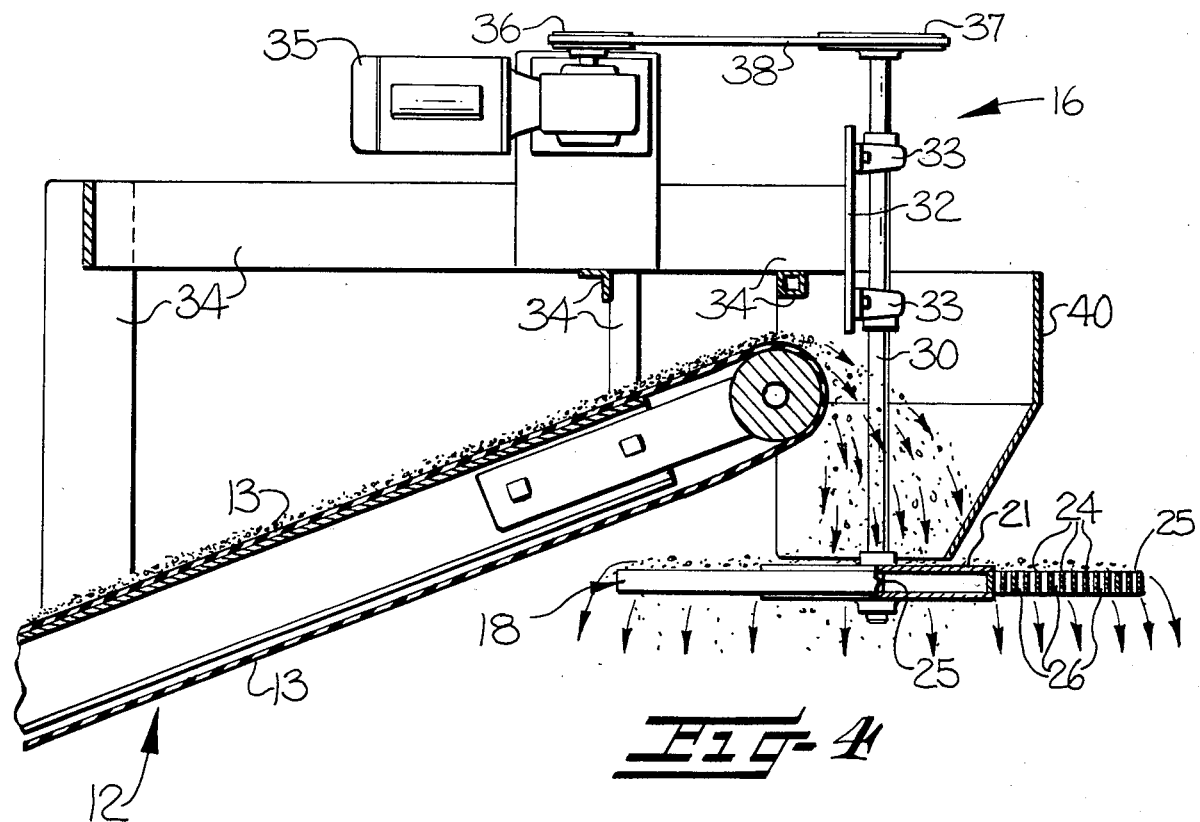
FIG. 4 is a sectional side elevation view of the apparatus.
Figure 5:
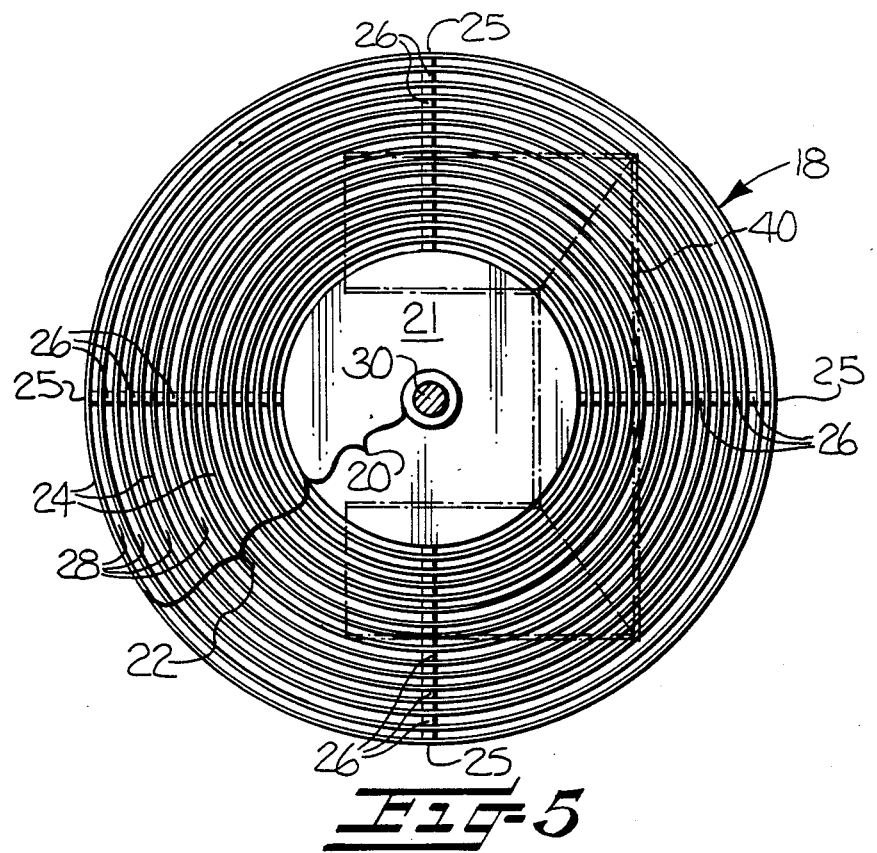
FIG. 5 is a top plan view of the grate of the apparatus.

In operation, the grate 18 as specifically described above is preferably rotated at a speed of about 36 rpm, which is insufficient to cause the grate to radially sling the fertilizer which is received thereupon. Also, the belt 13 of the conveyor is advanced at a sufficient speed so that some of the fertilizer strikes the shroud 40 and falls onto the plate 21, note FIG. 4. The buildup of the fertilizer on the plate 21 causes it to move radially onto the outer peripheral portion 22. As it does so, a portion drops through each opening 28 prior to its becoming segregated, and any portion of the fertilizer which does not fall through one of the openings drops over the outer peripheral edge of the grate. The rotation of the grate, and the inherent vibration, are believed to facilitate the movement of the fertilizer radially over the surface of the grate and through the openings 28. From the above, it will be seen that a large circular discharge pattern of non-segregated fertilizer is produced, which falls into the truckbed 14 to form a non-segregated, relatively flat pile.

In the drawings and specification, there has been set forth a preferred embodiment of the invention, and although specific terms are employed, they are used in a generic and descriptive sense only and not for purposes of limitation.

That which is claimed is:

1. An apparatus for handling a mixture of dry particulate materials of differing physical properties to form a pile of the mixture in an underlying bin, truckbed, or the like, and characterized by the ability to effectively eliminate segregation of the particles in the resulting pile, and comprising
    a grate having a generally planar upper surface and a circular peripheral outline and including a center portion comprising a non-perforated circular plate, and a plurality of concentrically arranged rings disposed about the outer periphery of said plate to form the remaining portion of said grate, with said rings being radially spaced apart to define a plurality of openings, with the rings and openings comprising at least about one-half the area of the grate,
    means mounting said grate in a generally horizontal orientation and for rotation about a vertical axis, and
    drive means for rotating said grate about said vertical axis,
    whereby a mixture of dry particulate materials may be delivered onto the upper surface of said grate while said grate is being rotated, so that at least a substantial portion of the mixture passes through the openings of the grate without substantial segregation to form an essentially non-segregated underlying pile.

2. The apparatus as defined in claim 1 wherein said rings and openings comprise at least about one-half the area of said grate, and wherein the radial width of each of said openings is not more than about twice the radial thickness of each of said rings.

3. The apparatus as defined in claim 2 wherein the center portion of said grate comprises a non-perforated circular plate, and said rings and openings comprise the remaining outer peripheral portion of said grate.

4. An apparatus for handling a mixture of dry particulate materials of differing physical properties to form a pile of the mixture in an underlying bin, truckbed, or the like, and characterized by the ability to effectively eliminate segregation of the particles in the resulting pile, and comprising
    a grate having a generally planar upper surface and a circular peripheral outline, and including a center portion comprising a non-perforated circular plate and a plurality of concentrically arranged rings disposed coaxially about the outer periphery of said plate, to form the remaining portion of said grate, with said rings being radially spaced apart to define annular openings between said rings, and with said rings and openings comprising substantially more than one-half the total area of said grate
    means mounting said grate in a generally horizontal orientation and for rotation about a vertical axis,
    drive means for rotating said grate about said vertical axis, and
    means for delivering a mixture of dry particulate materials onto the upper surface of the grate and while the grate is rotating, whereby at least a substantial portion of the mixture passes downwardly through said openings of said grate without substantial segregation to form an essentially non-segregated underlying pile.

5. The apparatus as defined in claim 4 wherein said delivering means comprises a conveyor having its discharge end disposed above said grate.

6. The apparatus as defined in claim 5 further comprising deflector plate means disposed above said grate and opposite said discharge end of said conveyor, for directing the mixture delivered from said conveyor onto the upper surface of said grate.

7. An apparatus for handling a mixture of dry particulate materials of differing physical properties to form a pile of the mixture in an underlying bin, truckbed, or the like, and characterized by the ability to effectively eliminate segregation of the particles in the resulting pile, and comprising
    a grate having a generally planar upper surface and a circular peripheral outline and including a central non-perforated circular plate, and a plurality of concentric annular rings disposed coaxially about the outer periphery of said plate, with each of said rings being composed of a segment of a hollow cylinder, and with said rings being radially spaced apart a distance not more than about twice the radial thickness of said rings to define a plurality of concentric annular openings, and with said rings and openings comprising substantially more than one-half the total area of said grate.

8. The apparatus as defined in claim 7 wherein said rings each have a radial thickness of about one-quarter inch, and said rings are radially spaced apart about one-half inch.

9. The apparatus as defined in claim 8 wherein said grate has an overall diameter of about three feet, and said plate has a diameter less than about one and one-half feet.

* * * * *